(12) United States Patent
Shimura

(10) Patent No.: US 7,273,178 B2
(45) Date of Patent: Sep. 25, 2007

(54) COMPACT SCAN ENGINE DISPOSED WITHIN A SCANNER HOUSING

(75) Inventor: Noriaki Shimura, Musashimurayama (JP)

(73) Assignee: Optoelectronics Co., Ltd., Saitama Pref. (JP)

( * ) Notice: Subject to any disclaimer, the term of this patent is extended or adjusted under 35 U.S.C. 154(b) by 14 days.

(21) Appl. No.: 11/336,679

(22) Filed: Jan. 20, 2006

(65) Prior Publication Data

US 2007/0170261 A1    Jul. 26, 2007

(51) Int. Cl.
*G02B 5/08* (2006.01)
(52) U.S. Cl. .............................. 235/462.36; 235/462.43
(58) Field of Classification Search ................ 235/454, 235/462.36, 462.38, 462.39, 462.43
See application file for complete search history.

(56) References Cited

U.S. PATENT DOCUMENTS

| 4,251,798 | A  | * | 2/1981  | Swartz et al. ............ 235/462.2 |
| 4,962,980 | A  | * | 10/1990 | Knowles ..................... 359/213 |
| 5,786,585 | A  | * | 7/1998  | Eastman et al. ........ 235/462.15 |
| 5,970,184 | A  | * | 10/1999 | Katoh et al. ................. 382/312 |
| 6,360,949 | B1 | * | 3/2002  | Shepard et al. ......... 235/462.43 |
| 6,575,368 | B1 | * | 6/2003  | Tamburrini et al. .... 235/462.25 |
| 6,905,071 | B2 | * | 6/2005  | Schmidt et al. ........ 235/462.45 |

* cited by examiner

*Primary Examiner*—Michael G. Lee
*Assistant Examiner*—Paultep Savusdiphol
(74) *Attorney, Agent, or Firm*—Kaplan Gilman Gibson & Dernier LLP

(57) ABSTRACT

A scanner with a compact scan engine having a light source for generating a light beam is provided, optionally with a polygon scan mirror as well. A seat with the compact scan engine attached thereto is utilized, and the scan engine is significantly smaller than the scanner housing.

12 Claims, 5 Drawing Sheets

COMPACT SCAN ENGINE DISPOSED WITHIN A SCANNER HOUSING

BACKGROUND OF THE INVENTION

1. Field of the Invention

The present invention generally relates to compact scan engines, more particularly, relates to a compact scan engine disposed within a scanner housing.

2. Description of the Related Art

Scan engines used for scanning symbols having data identifying characteristics such as barcodes are known. Typically, a scan engine comprises a circuit board that takes up most of the space within a housing. Often, the housing has to be designed to accommodate large circuit boards and other components, even though a designer may wish to design the housing differently. An exemplary such prior art arrangement is shown in FIG. 1, wherein a circuit board 102 is mounted upon a housing 103. Notably, the perimeter 104 of the circuit board is substantially the same size as the housing.

There is a need to have a compact scan engine with limited dimensional restrictions.

SUMMARY OF THE INVENTION

The present invention generally provides a compact scan engine with limited dimensional restrictions so as to be disposed within a housing of a scanner.

The present invention further provides a compact scan engine with limited dimensional restrictions such that the relatively small compact scan engine with a housing can be positioned at various angles and orientations with respect to the housing.

The present invention still further provides a compact scan engine with limited dimensional restrictions such that the relatively small compact scan engine can be positioned to suit a multiplicity of light paths and the compact scan engine can be positioned at an angle with respect to at least one surface of the scanner housing.

The present invention yet still further provides a compact scan engine with limited dimensional restrictions such that various requirements to place mirrors along some scan light paths can be accommodated due to the various positioning of the compact scan engine.

A scanner with a compact scan engine having a light source for generating a scanning light beam is provided. The scanner also has a reflector mirror for directing light to a prescribed light path and for receiving light from said light path. An embodiment of the invention also provides a seat with the compact scan engine mounted thereon for orienting the light source on the compact scan engine such that the light path can reach the polygon mirror. The size of the scan engine and mounting thereof within the housing permits a more compact housing and flexible design.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention relates to a compact scan engine variously disposed within a scanner housing. Referring to FIGS. 2-5, a preferred embodiment of the present invention is described.

A compact scan engine 12 having a circuit board 12a and a light source (not shown) with its associated optic components is provided. Such a scan engine may be typical of what is available commercially, and may include an inner scan mirror that may optionally be capable of oscillation, optionally digital processing components, a light source, a collecting mirror, and potentially other functions as well. All the components, including the scan engine 12, may be mounted within the housing 30, which may be fabricated from plastic or similar materials.

Portion 14a as designated is preferably a flattened portion of reflecting mirror 14. Portion 14a is utilized to reflect the outgoing beam generated by the light source within scan engine 12. The remainder of mirror 14 is preferably utilized for collecting light reflected from the target.

Figure 1:
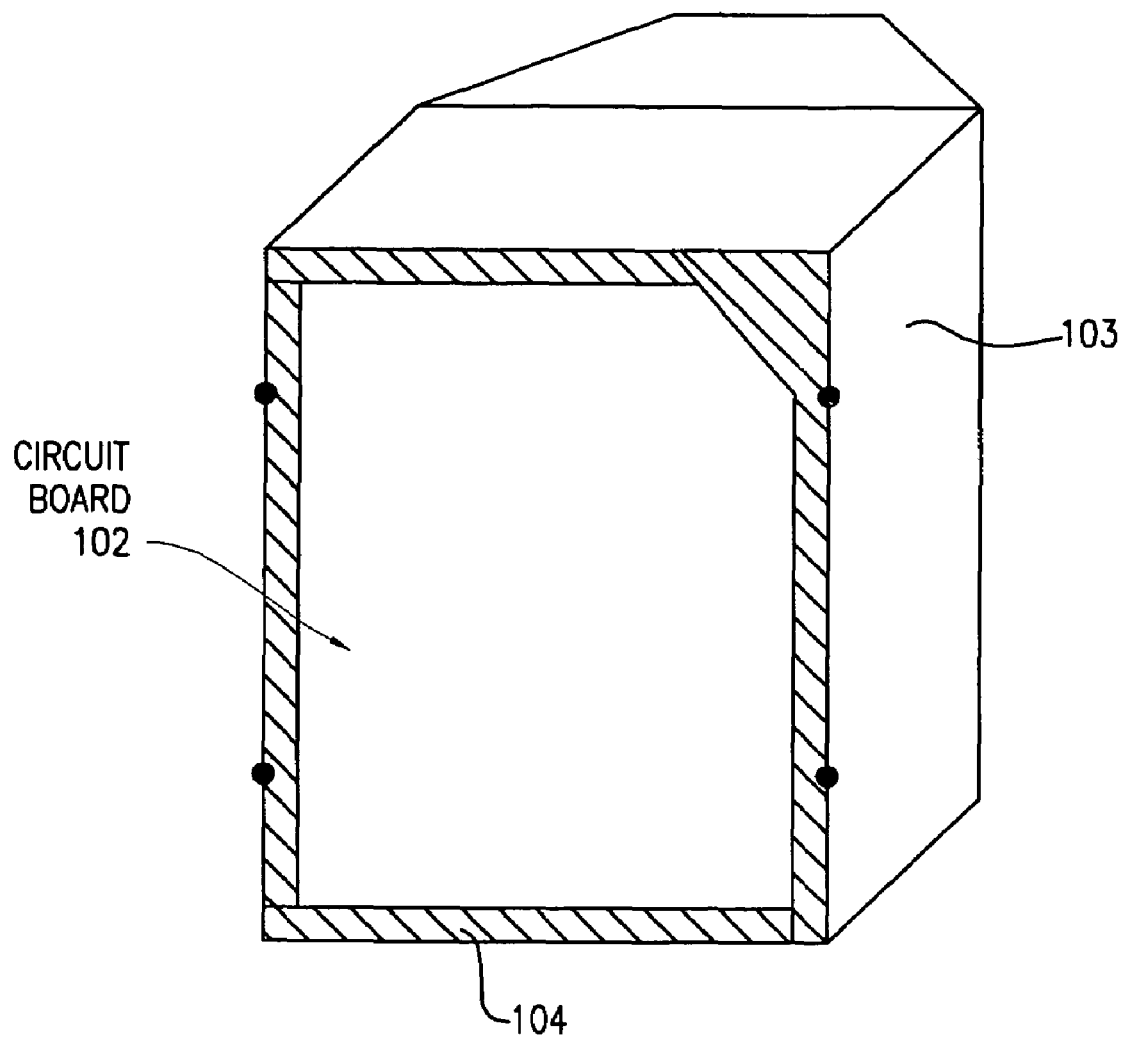
FIG. 1 depicts a prior art scan system with a scan engine.
Figure 2:
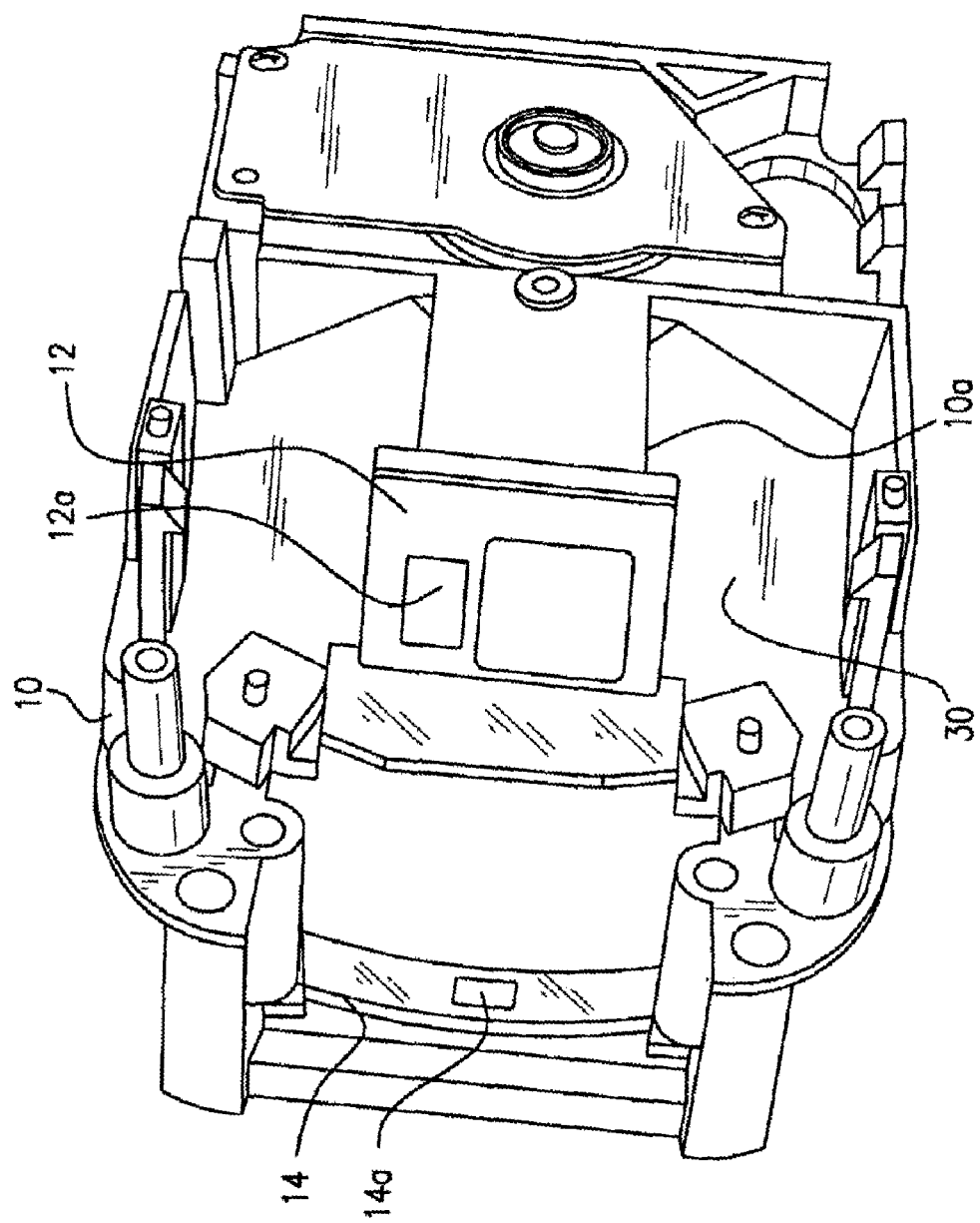
FIG. 2 depicts a first perspective view of the present invention.
Figure 3:
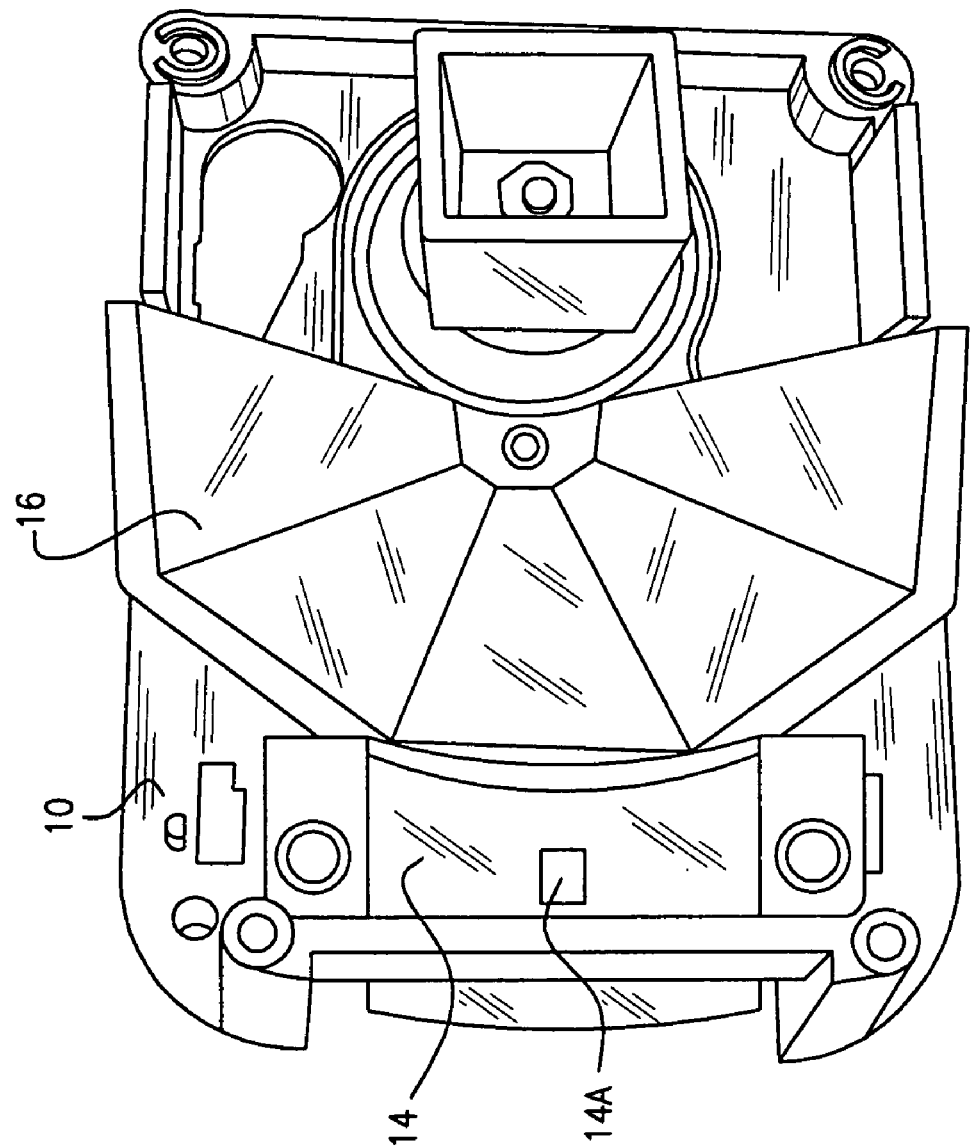
FIG. 3 depicts a second perspective view of the present invention.
Figure 4:
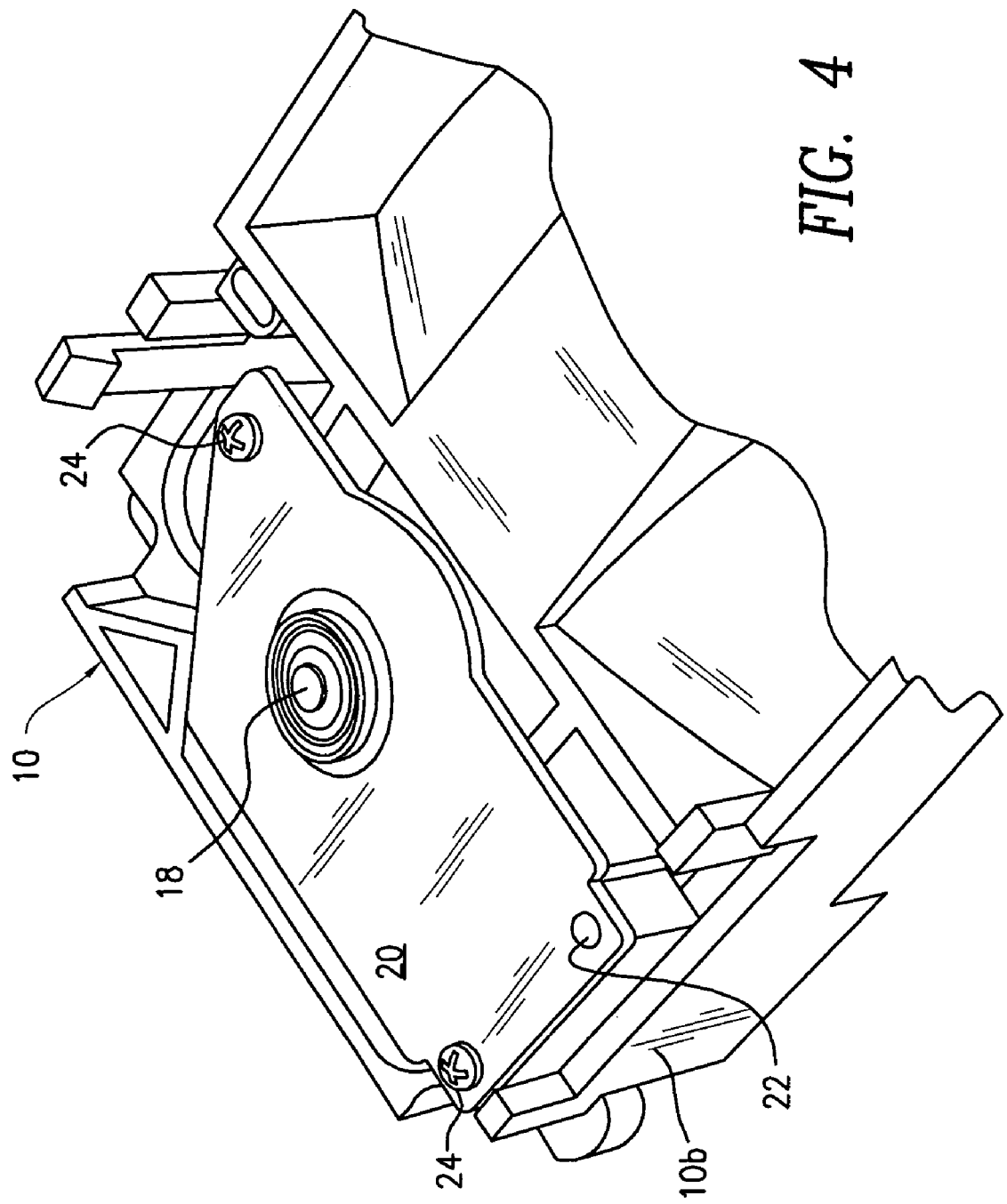
FIG. 4 depicts a third perspective view of the present invention.

An outgoing light beam, after reflecting off of portion 14a, traverses onto a rotating polygon mirror 16 shown in FIG. 3, which is typically driven by an electro-magnetic driver 18 (FIG. 4). Driver 18 has its non-moving parts rigidly affixed onto bracket 20, which is itself rigidly affixed onto interconnect 10. Housing 30 has receiving elements such as protrusion 22 or threaded holes (not shown) disposed to receive screws 24. In addition, driver 18 may be a unidirectional or bidirectional driver.

Figure 5:
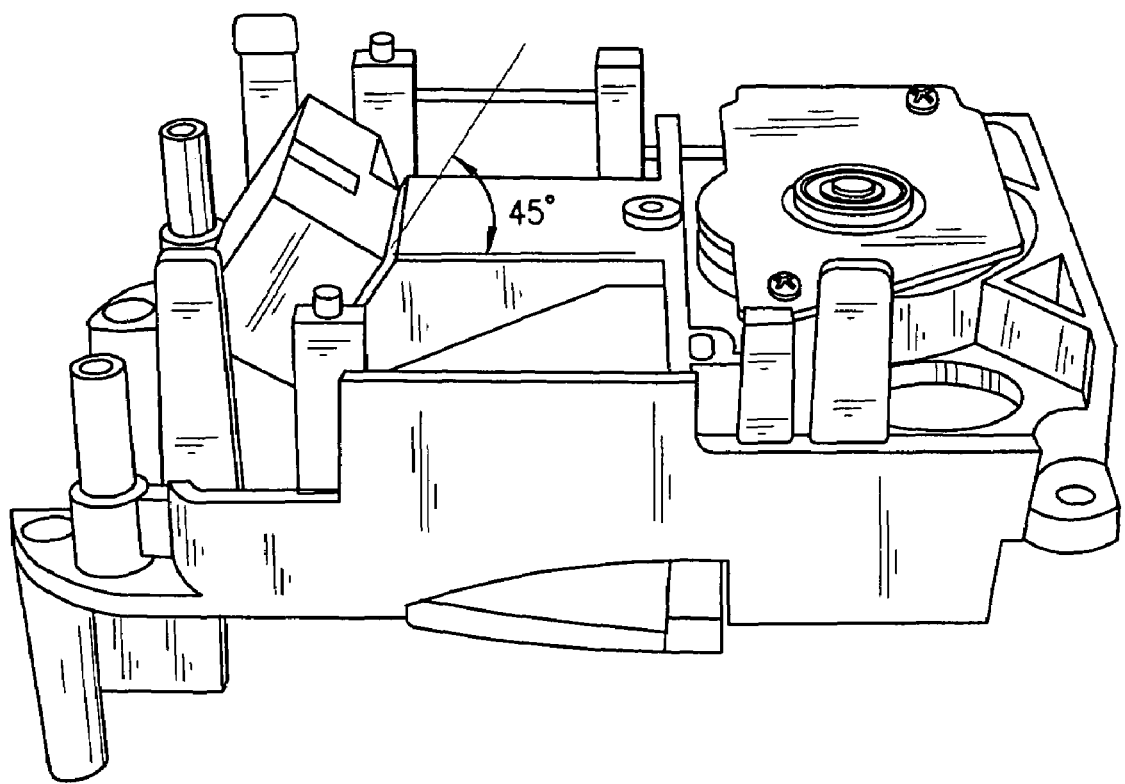
FIG. 5 shows the mounting of a scan engine on a housing in accordance with one embodiment of the present invention.

The light beam is then directed out of the housing after being reflected off of the polygon mirror 16. This produces a multidirectional pattern for scanning of symbols wherein the symbol orientation with respect to the scanner is not fixed. Importantly, the housing 30 shown best in FIG. 5 is significantly larger than the scan engine 12.

The reflected light from the scanned symbols travels back to be collected by mirror 14. Mirror 14 collects the light and focuses it on a photo-sensor contained within scan engine 12.

A seat 10a for suitably positioning of compact scan engine 12 is formed on interconnect 10. Seat 10a may be angularly oriented with respect to the housing 30. In other words, compact scan engine 12 can have an angle with respect to any surface of the housing due to its compact nature. Unlike prior art systems wherein the circuitry making up the scan engine is typically mounted on a circuit board substantially as large as the housing 30 itself, the scan engine 30 of the present invention is significantly smaller than the housing 30. As a result, the scan engine 12 may be disposed at many different angles and orientations with respect to the housing.

Alternatively, the seat may be eliminated and the scan engine mounted directly on any portion of the housing or otherwise positioned to properly transmit the light beam out to the polygon mirror for scanning.

The perimeter of scanner 12 need not be equal to a perimeter of housing 30. Instead of mounting scanner 12 and/or its associated circuit board to the perimeter of housing 30, scanner 12 may instead be mounted to any angular seat 10*a* formed in housing 30. A preferred angle is approximately 45 degrees, and is shown best in FIG. 5.

In the preferred embodiment, compact scan engine 12 is positioned such that angled reflection mirror 14 serves as a reflector for reflecting light back and forth between compact scan engine 12 and polygon mirror 16. Other embodiments may desire a different light path. Therefore, compact scan engine 12 due to its compact nature can adjust accordingly. Moreover, seat 10*a* can be molded into the housing at a variety of angles.

Compact scan engine 12 may be affixed onto seat 10*a* by gluing, screws, snap-fit, etc. Housing 30 may also have seats for mounting any of the other components such as mirror 14. Typically, the scan engine is less than 15% of the size of the housing itself. While the housing has to accommodate the scanning polygon mirror in one preferred embodiment, the scan engine is not restricted by such a size requirement.

The light used in the present invention is preferably a laser diode, but can be other types and from other sources as well. Furthermore, the compact scan engine may include a scan engine housing; a light source within said scan engine housing; and a circuit board forming one side of said compact scan engine housing. In addition, the compact scan engine may also include an inner reflective mirror for reflecting light generated by the light source.

While the foregoing is directed to exemplary embodiments of the present invention, other and further embodiments of the invention may be devised without departing from the basic scope thereof, and the scope thereof is determined by the claims that follow. The invention in a preferred embodiment utilizes a scan engine having a perimeter less than half the size of the perimeter of the housing.

What is claimed is:

1. A scanner comprising:
    a housing having a perimeter;
    a scan engine having a light source for generating a light beam and associated optics for directing the light beam to;
    a rotating mirror within said housing, and for causing said light beam to be scanned across a polygon mirror, mounted on a surface of said housing, comprising a plurality of sections, said polygon mirror then scanning said light beam across a symbol to be read; and
    a seat with said housing on which said scan engine is mounted, said seat being substantially smaller than the perimeter of the housing, said scan engine being mounted on a slanted seat disposed behind said polygon mirror and on a different surface of said housing from said polygon mirror.

2. The scanner of claim 1, wherein the scan engine comprising
    a scan engine housing;
    a light source disposed within said scan engine housing; and
    a circuit board forming one side of said compact scan engine housing.

3. The scanner of claim 2, wherein the scan engine comprises an inner mirror for reflecting light generated by said light source.

4. The scanner of claim 2 further wherein the seat is substantially equal in size with the scan engine.

5. The scanner of claim 1 wherein the seat is formed integrally with, and at an acute angle to, a surface of said housing.

6. A scanner comprising a housing having a seat, and a scan engine mounted to the seat, wherein the perimeter of the scan engine is substantially smaller than the perimeter of the housing, further comprising a rotating mirror and a polygon mirror, mounted to the same housing, and wherein the seat and the scan engine are mounted behind the polygon mirror, and wherein light from the scan engine is directed from behind the polygon mirror over the polygon mirror to the rotating mirror in front of the polygon mirror, and onto the polygon mirror.

7. The scanner of claim 6 further comprising an inner scan mirror, said inner scan mirror being oscillatable and disposed within said scan engine.

8. The scanner of claim 7 further comprising mounting said scan engine at an angle with respect to said housing.

9. A scanner comprising:
    a housing, a polygon mirror, a rotating mirror, and a scan engine, all mounted to said housing, and configured such that the scan engine is disposed behind the polygon mirror, and a beam from said scan engine is lifted over said polygon mirror, projected onto said rotating mirror, and then transmitted to a front side of said polygon mirror for conveyance to a target symbol.

10. The scanner of claim 9 wherein the scan engine is formed with an internal mirror that is oscillatable.

11. A scanner having a housing, the housing having a bottom surface, the housing including an angularly mounted scanning engine substantially at a first end of said bottom surface, and metallic mount substantially at an opposite end of said bottom surface, the housing further having a top surface, the top surface having a rotating mirror and a polygon mirror, the top and bottom surfaces being back to back with each other.

12. The scanner of claim 11 wherein the housing is substantially as large as said polygon mirror, and wherein said scan engine is mounted substantially behind said polygon mirror.

* * * * *